United States Patent
Jones

(10) Patent No.: US 9,656,764 B2
(45) Date of Patent: May 23, 2017

(54) SKEW SENSING ARRANGEMENT

(71) Applicant: Goodrich Actuation Systems Limited, Solihull, West Midlands (GB)

(72) Inventor: Tony Jones, Birmingham (GB)

(73) Assignee: GOODRICH ACTUATION SYSTEMS LIMITED, West Midlands (GB)

(*) Notice: Subject to any disclaimer, the term of this patent is extended or adjusted under 35 U.S.C. 154(b) by 77 days.

(21) Appl. No.: 14/707,575

(22) Filed: May 8, 2015

(65) Prior Publication Data

US 2016/0001894 A1    Jan. 7, 2016

(30) Foreign Application Priority Data

Jul. 7, 2014 (EP) .................................. 14176001

(51) Int. Cl.
B64D 45/00 (2006.01)
B64C 9/16 (2006.01)

(52) U.S. Cl.
CPC ............ B64D 45/0005 (2013.01); B64C 9/16 (2013.01); *B64D 2045/001* (2013.01)

(58) Field of Classification Search
None
See application file for complete search history.

(56) References Cited

U.S. PATENT DOCUMENTS

| | | | |
|---|---|---|---|
| 5,680,124 A | 10/1997 | Bedell et al. | |
| 5,686,907 A * | 11/1997 | Bedell | B64D 45/0005 244/194 |
| 6,299,108 B1 * | 10/2001 | Lindstrom | B64C 9/02 244/194 |
| 6,382,566 B1 * | 5/2002 | Ferrel | B64C 9/06 244/215 |
| 6,704,679 B1 * | 3/2004 | Coni | G01D 3/024 702/127 |
| 7,921,729 B2 * | 4/2011 | Conner | B64D 45/0005 340/686.1 |
| 7,945,425 B2 * | 5/2011 | Marx | B64D 45/0005 244/213 |
| 8,646,346 B2 | 2/2014 | Hubberstey et al. | |
| 8,746,625 B2 * | 6/2014 | Recksiek | B64C 9/16 244/215 |
| 2009/0248366 A1 | 10/2009 | Scheid et al. | |
| 2010/0100355 A1 * | 4/2010 | Marx | B64D 45/0005 702/183 |
| 2010/0277346 A1 | 11/2010 | Moy et al. | |
| 2010/0288886 A1 * | 11/2010 | Schievelbusch | B64D 45/0005 244/194 |
| 2012/0325976 A1 | 12/2012 | Parker | |

(Continued)

FOREIGN PATENT DOCUMENTS

EP    2392510 A1    12/2011

OTHER PUBLICATIONS

European Patent Office Search Report; Application No. 14176001. 7-1754; Dated Dec. 19, 2014; 4 pages.

*Primary Examiner* — Russell Frejd
(74) *Attorney, Agent, or Firm* — Cantor Colburn LLP

(57) ABSTRACT

A skew detection system for a high lift system for an aircraft, wherein pairs of sensors 4a, 4b with onboard data processing capabilities provide an onboard determination of relative skew between the sensors of each pair as an indication of skew of a flap of the high lift system.

5 Claims, 3 Drawing Sheets

(56) References Cited

U.S. PATENT DOCUMENTS

| | | | |
|---|---|---|---|
| 2013/0009017 A1 | 1/2013 | Thompson et al. | |
| 2013/0099963 A1* | 4/2013 | Wu | G01S 19/46 342/357.29 |
| 2014/0297102 A1* | 10/2014 | Moy | B64D 45/00 701/33.9 |
| 2014/0343784 A1* | 11/2014 | Brady | B64F 5/0045 701/29.1 |

* cited by examiner

SKEW SENSING ARRANGEMENT

CROSS REFERENCE TO RELATED APPLICATIONS

This application claims priority to European Patent (EP) Application No. 14176001.7 filed Jul. 7, 2014, the entire contents of which are incorporated herein by reference.

TECHNICAL FIELD

The present invention relates to systems for sensing skew in aircraft panels.

BACKGROUND

Aircraft wings are provided with airfoils or so-called high lift systems which extend from the wing edges. The high lift devices are known as "stats" (when on the wing leading edge) or "flaps" (when on the wing trailing edge).

Actuating mechanisms cause the flaps or slats to lift or lower relative to the wing to vary aerodynamic drag or lift. This allows the aircraft to be accelerated/decelerated for better control on take off and landing.

Conventionally, the flaps/slats are driven by two separate actuators—one on each end of the flap/slat. These are coordinated to lift/extend the flap or slat in a uniform manner. If one of the actuators fails or does not operate properly, the panel can be skewed or asymmetrical relative to the wing. This can adversely affect the control of the aircraft.

It is important, therefore, to be able to detect and report/respond to such skew in high lift devices. Indeed, it is now a requirement that aircraft include skew detection systems.

Various mechanical and electrical/electronic skew monitoring systems have been discussed. Current mechanical solutions consist of routing a cable along the length of the wing through each moving panel, such that panel skew would displace the cable to signal a switch. Alternatively, lost motion devices are sometimes used to detect a change in the structural load path due to mechanical failure. Both cable based and lost motion based solutions provide significant installation challenges and monitoring accuracy can be poor.

Current electrical/electronic solutions consist of individual sensors mounted at each panel linkage point, the outputs of which are typically connected to a central processing point and are compared against each other to identify abnormal position information. Sensor based solutions require significant aircraft level wiring since all sensors come to a single point, add significant interface complexity to the central computer (a typical flap system would require 16 RVDT interfaces to monitor 4 panels), and require the integration of complex monitoring software into the flap/slats electronic control units. U.S. Pat. No. 5,680,124, US 2010/0100355 and U.S. Pat. No. 8,646,346 all describe skew detecting systems using electrical/electronic sensors.

It is desirable to provide a skew monitoring system that is less complex and less prone to failure.

SUMMARY

Accordingly, there is provided a skew detection system comprising:

a pair of sensors, at least one of said sensors in said pair including means for comparing positional information from each sensor of the pair, indicative of a position of the respective sensor, and determining relative skew between the sensors of the pair based on the comparison.

Systems will usually (but not necessarily) have several pairs of sensors to determine skew at different levels.

Also provided is a high lift system comprising at least one moveable flap provided with a skew detection system as described above wherein the relative skew between the sensors is indicative of skew of the flap.

Preferably, such high lift systems have several flaps each provided with several pairs of sensors.

BRIEF DESCRIPTION OF THE DRAWINGS

Examples will now be described, by way of example only, with reference to the drawings.

DETAILED DESCRIPTION

Figure 1:
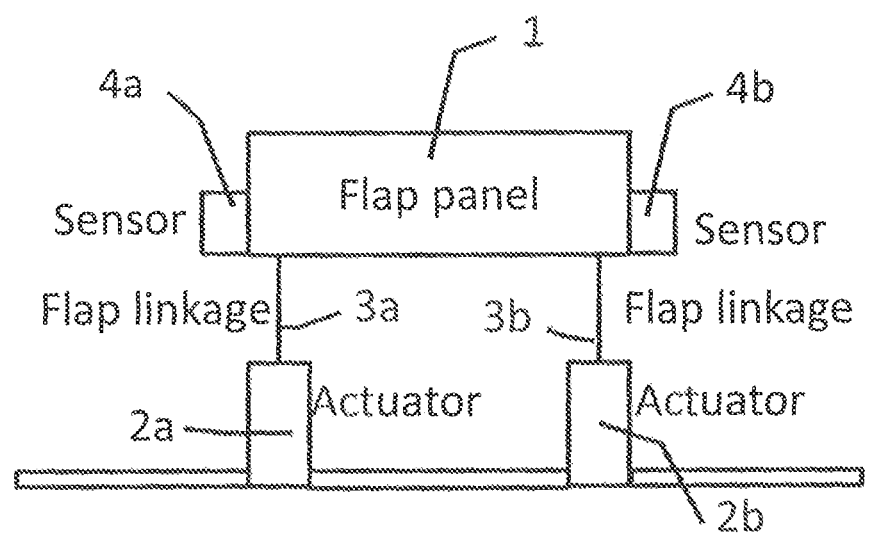
FIG. 1 shows a simple block diagram of a conventional skew detection system.
Figure 2:
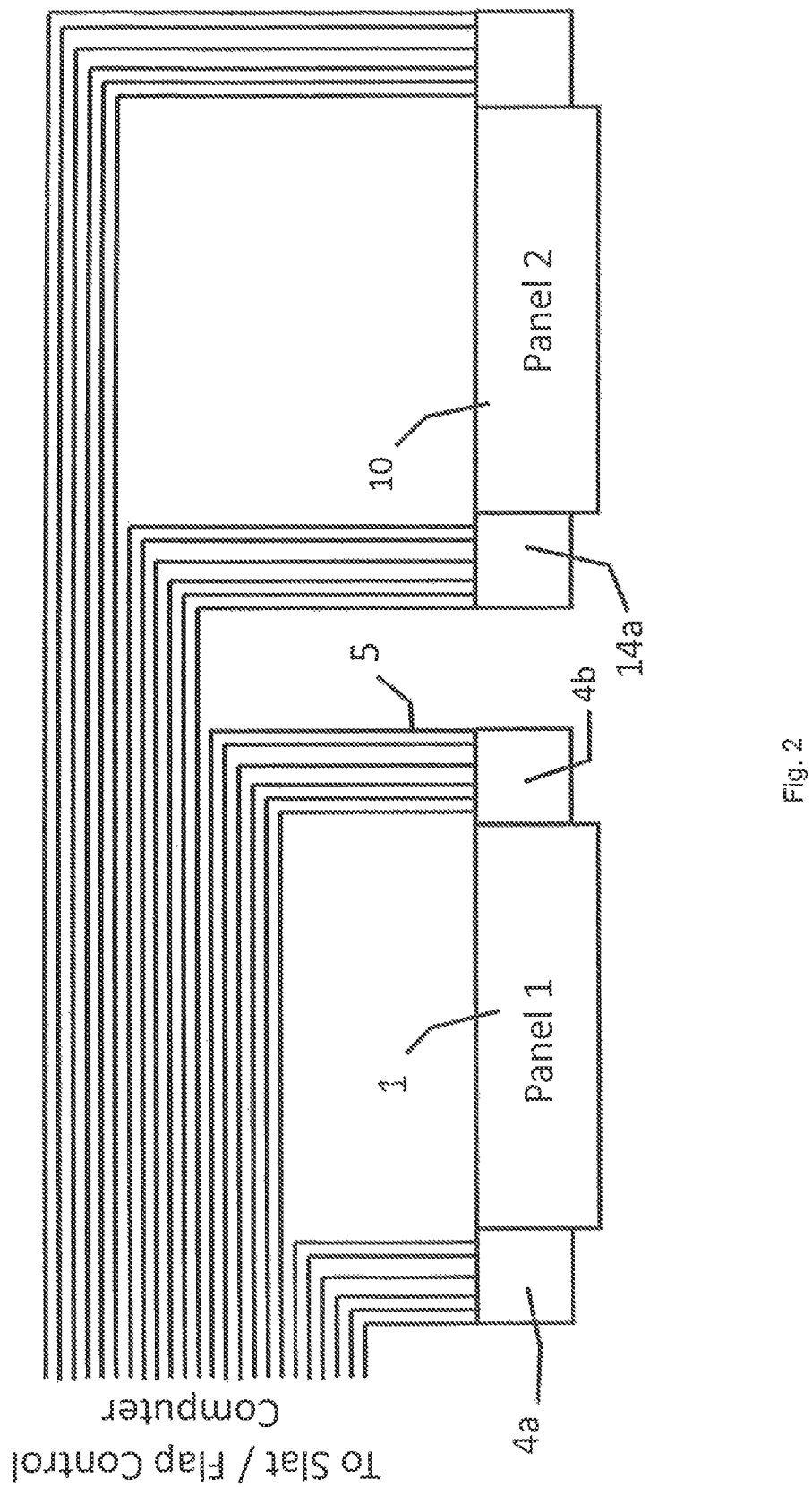
FIG. 2 is a simple diagram showing the routing for sensor signals in a conventional system such as shown in FIG. 1.

With reference first to FIGS. 1 and 2, the operation of known electrical skew monitoring systems will be briefly described.

A high lift system such as a flap or slat system would typically consist of a number of gearboxes (2a, 2b) which are driven by transmission shafts powered from a central motor. A high lift panel would have a gearbox actuator dedicated to driving each of its ends which are connected to it through a mechanical linkage or frequently through a toothed rack arrangement. The skew detection system aims to establish if either the linkage mechanism or the gearboxes have broken, which would leave one end of the panel unsupported or skewed relative to the other. For this reason the skew system tries to place the sensor as close to the end of the panel as is practicable, to maximise the number of potential failures which would be detected. Each flap/slat panel on the aircraft would be provided with a similar skew detection arrangement.

FIG. 2 shows how the sensor signals are connected for processing, showing two panels 1, 10 by way of example only. Any number of panels may be provided. For example, a typical flap system would have four or six panels, whereas a slat system may have twelve. Conventional sensors would typically be of the linear variable differential transformer (LVDT) or rotary variable differential transformer (RVDT) type, which dependent on the level of fault isolation necessary, would have 5 or 6 wires each. Often the sensors at each end of the panel would need to be duplex, meaning there may need to be 10 or 12 wires to each end of up to 12 panels. The output of each sensor is sent to the slat/flap central control computer or processor along a respective wire, where the signals are analysed to determine skew.

RVDT and LVDT sensors are passive devices, so the central computer would, in such an example, typically have to drive an excitation coil within the sensor with a high frequency excitation voltage. The central computer would then measure the resulting induced voltages on two sense coils within the sensor, and on the basis of the relative magnitudes of the two induced voltages, the sensor position is inferred. The signals from the position sensors at each end of the panel are demodulated in this way to give a value for sensor rotational or translational position. These demodulated position signals can then be transferred through a function which represents the kinematics of the panel linkage with respect to the sensor in order to estimate the position of each end of the high lift panel. The difference in position between the two ends of the panel is then, in one algorithm, compared against an acceptable skew threshold to determine if a failure has occurred.

As mentioned above, such skew detection systems can require complex wiring and processing.

The present disclosure replaces the conventional sensors with pairs of so-called "smart sensors" wherein each pair performs, locally, a comparison of the relative positions of the sensors in that pair. The comparison is made locally/on board at the sensor(s) rather than at the central computer.

Preferably both sensors of the pair have onboard data processing capabilities. Most preferably, all sensors of the system are functionally the same.

Each panel to be monitored will have at least one pair of sensors. In a practical system, several pairs of smart sensors will be provided for each panel, with pairs operating together to detect skew at a respective panel level.

To identify skew, the respective sensor signals are compared with each other and the difference compared to a threshold and/or to a skew monitoring profile stored in the sensor. In practice, some small degree of skew can be tolerated by an aircraft and will often be present. The system should preferably be set to avoid being triggered by such low level skew.

Because of the on-board or local processing capability of the smart sensors, the complexity of the LVDT/RVDT wirings of conventional systems is contained within the sensor itself, meaning that the aircraft level wiring is much simpler.

Figure 3:
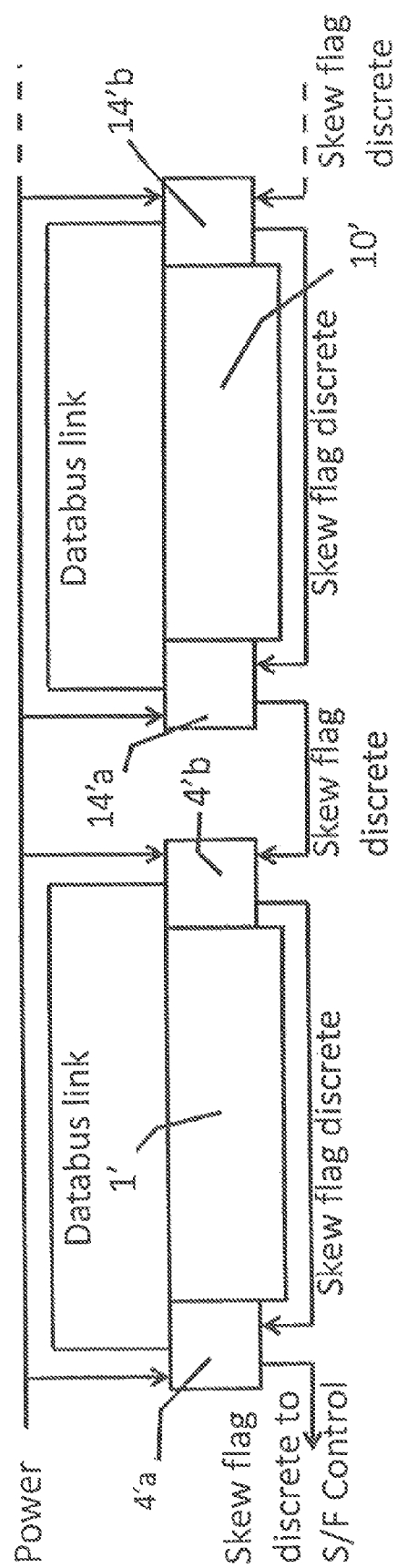
FIG. 3 is a simple block diagram showing a skew detection system according to the present disclosure.

An example of the invention, simplified to show only two panels, for ease of explanation, is shown in FIG. 3.

Panels 1' and 10' are as shown in FIGS. 1 and 2 and can be actuated in any known way, such as is shown in FIG. 1. The sensors 4'a, 4'b, 14'a, 14'b, however, are smart sensors—i.e. have on-board processing capabilities and operate in pairs. Within each pair, the sensors are connected by a data crosslink, which could be via a local data bus, or via an analogue connection. The sensor pairs may be configured to set a skew flag on the basis of comparison with their partner sensor, and on the basis of an incoming skew flag from outboard (i.e. other panels') sensors. Using this approach it would be possible to daisy chain any number of sensor pairs across the aircraft, and maintain a simple discrete input into the control computer which summarises the health of the complete system with respect to skew.

In such a "daisy chain" approach, each sensor pair would check an individual panel to see if a failure leading to skew has occurred. Rather than each pair then communicating individually with the central computer, each pair can pass a message to its adjacent inboard pair, capturing whether a skew exists and possibly containing other summary information (for example an identifier of which pair has detected a skew). This message can then be passed along the line of sensor pairs such that only the most inboard sensor pair would need a connection to the central computer. The message could be, for example, in the form of a discrete analogue signal (HI/LO voltage), or a digital data item.

In the simplest arrangement, the functions within the sensor itself should be fairly simple. Within the smart sensor may be an RVDT or LVDT with its associated drive circuitry. This would demodulate the position of the sensor and feed the resulting position through a look up table which would compensate for the local kinematics of where the sensor is attached. The cross sensor data connection would provide a compensated reference position for the other end of the panel. These two positions would then be compared with respect to an acceptable asymmetry threshold and if the difference between the two exceeds the threshold a fault flag would be set true (possibly by setting a simple analogue discrete signal high). The sensor would also set its fault flag high if the fault flag of the sensor immediately outboard of it was set to high. The control computer therefore would only need to take an input from the most inboard smart sensor.

The rationale behind passing a fault flag from sensor pair to sensor pair along the wing, in some embodiments, is to simplify the interface with the control computer. Passing the signal in this way means that there are fewer interfaces required in the control computer, and that the system is scaleable onto an aircraft with more panels without having to modify the control computer.

As compared to conventional systems, the present system has several advantages, including:
Aircraft wiring is reduced due to local sensor demodulation;
Sensor accuracy is improved due to local sensor demodulation;
Software complexity within the flap/slat control computer is significantly reduced;
Interface definition with the flap/slat control computer is significantly simplified;
Skew system integration into the high lift control system is significantly simplified;
Skew system development timeline is no longer dependent upon the flap/slat computer software timeline;
A small family of smart sensors could feasibly cover the majority of aircraft systems;
Additional beneficial functionality could easily be integrated into the sensor software, such as automatic optimisation of skew monitoring thresholds for each panel.

The invention claimed is:

1. A skew detection system comprising:
a pair of sensors, at least one of said sensors in said pair including means for comparing positional information from each sensor of the pair, indicative of a position of the respective sensor, and determining relative skew between the sensors of the pair based on the comparison.

2. A skew detection system as in claim 1, wherein both sensors of the pair include onboard processing means for comparing the positional information.

3. A skew detection system as in claim 1, comprising a plurality of such pairs of sensors.

4. A skew detection system according to claim 3, whereby the results of the comparison for a first pair of sensors are sent to the next pair of sensors, and so on until a last pair of sensors, which sends the results of the comparison for all pairs of sensors to a central computer.

5. A high lift system for an aircraft, comprising at least one moveable flap provided with a skew detection system as claimed in claim 1, wherein the relative skew between the sensors is indicative of skew of the at least one moveable flap.

* * * * *